United States Patent
Hansson et al.

(10) Patent No.: US 10,719,236 B2
(45) Date of Patent: Jul. 21, 2020

(54) MEMORY CONTROLLER WITH NON-VOLATILE BUFFER FOR PERSISTENT MEMORY OPERATIONS

(71) Applicant: ARM Ltd., Cambridge (GB)

(72) Inventors: Andreas Hansson, Cambridge (GB); Stephan Diestelhorst, Cambridge (GB); Wei Wang, Cambridge (GB); Irenéus Johannes de Jong, Cambridge (GB)

(73) Assignee: ARM Ltd., Cambridge (GB)

( * ) Notice: Subject to any disclaimer, the term of this patent is extended or adjusted under 35 U.S.C. 154(b) by 0 days.

(21) Appl. No.: 14/947,877

(22) Filed: Nov. 20, 2015

(65) Prior Publication Data

US 2017/0147207 A1 May 25, 2017

(51) Int. Cl.
*G06F 3/06* (2006.01)
*G06F 15/78* (2006.01)

(52) U.S. Cl.
CPC ............ *G06F 3/061* (2013.01); *G06F 3/0656* (2013.01); *G06F 3/0679* (2013.01); *G06F 15/7853* (2013.01)

(58) Field of Classification Search
CPC .... G06F 3/061; G06F 15/7853; G06F 3/0656; G06F 3/0679
See application file for complete search history.

(56) References Cited

U.S. PATENT DOCUMENTS

| | | | | |
|---|---|---|---|---|
| 3,806,830 A * | 4/1974 | Yonezu | ............... | H01S 5/1032 372/45.01 |
| 5,745,915 A * | 4/1998 | Cooper | ............... | G06F 3/061 711/114 |
| 6,009,498 A * | 12/1999 | Kumasawa | ............. | G06F 3/061 360/48 |
| 6,360,300 B1 * | 3/2002 | Corcoran | ............. | G06F 3/0608 711/113 |
| 6,449,689 B1 * | 9/2002 | Corcoran | ............. | G06F 3/0608 711/113 |
| 6,463,503 B1 * | 10/2002 | Jones | ...................... | G06F 3/061 707/999.202 |
| 6,740,082 B2 * | 5/2004 | Shadduck | .......... | A61B 18/1485 600/101 |
| 6,862,692 B2 * | 3/2005 | Ulrich | ..................... | G06F 3/061 711/114 |
| 7,219,846 B2 * | 5/2007 | Kuo | ...................... | G06F 13/387 235/486 |
| 7,298,640 B2 | 11/2007 | Chen et al. | | |
| 7,639,523 B2 | 12/2009 | Celinska et al. | | |

(Continued)

FOREIGN PATENT DOCUMENTS

| WO | WO 2008058264 A2 * | 5/2008 | ........... G11C 13/003 |
|---|---|---|---|
| WO | WO 2008058264 A3 * | 9/2008 | ........... G11C 13/003 |

OTHER PUBLICATIONS

Palomar Technologies, "System on a Chip (SOC)", Apr. 14, 2011, pp. 1 , https://web.archive.org/web/20110414082858/http://www.palomartechnologies.com/applications/system-on-a-chip/.*

(Continued)

*Primary Examiner* — Christopher D Birkhimer
(74) *Attorney, Agent, or Firm* — Berkeley Law & Technology Group, LLP

(57) ABSTRACT

Subject matter disclosed herein may relate to buffers, and may relate more particularly to non-volatile buffers for memory operations.

19 Claims, 6 Drawing Sheets

(56) References Cited

U.S. PATENT DOCUMENTS

| | | | |
|---|---|---|---|
| 7,649,743 B2* | 1/2010 | Ni | G06F 12/1416 361/727 |
| 7,778,063 B2 | 8/2010 | Brubaker et al. | |
| 7,872,900 B2 | 1/2011 | Paz de Araujo et al. | |
| 8,788,765 B2* | 7/2014 | Jeddeloh | G06F 13/1642 710/310 |
| 8,904,531 B1* | 12/2014 | Saklikar | G06F 21/552 707/695 |
| 9,130,968 B2* | 9/2015 | Aviles | H04L 67/1097 |
| 9,135,949 B2* | 9/2015 | Shiratori | G11B 20/10 |
| 9,141,299 B2* | 9/2015 | Grimsrud | G06F 1/3287 |
| 9,141,528 B2* | 9/2015 | Gorobets | G06F 12/0246 |
| 9,152,350 B2* | 10/2015 | Marukame | G06F 3/0679 |
| 9,170,932 B1* | 10/2015 | Lo | G06F 12/0246 |
| 9,514,814 B1* | 12/2016 | Sandhu | G11C 13/0069 |
| 9,548,118 B1* | 1/2017 | Bhavnagarwala | G11C 13/0069 |
| 9,589,636 B1* | 3/2017 | Bhavnagarwala | G11C 13/0002 |
| 2002/0118582 A1* | 8/2002 | Butterworth | G06F 3/061 365/200 |
| 2002/0194526 A1* | 12/2002 | Ulrich | G06F 3/061 714/6.12 |
| 2003/0221062 A1* | 11/2003 | Shimada | G06F 3/0613 711/114 |
| 2005/0138281 A1* | 6/2005 | Garney | G06F 3/0619 711/112 |
| 2005/0144514 A1* | 6/2005 | Ulrich | G06F 3/061 714/6.12 |
| 2005/0193164 A1* | 9/2005 | Royer, Jr. | B82Y 10/00 711/113 |
| 2006/0005074 A1* | 1/2006 | Yanai | G06F 3/0601 714/6.32 |
| 2008/0107801 A1 | 5/2008 | Celinska et al. | |
| 2008/0198545 A1* | 8/2008 | Ni | G06F 21/78 361/679.31 |
| 2009/0276562 A1 | 11/2009 | Lieber | |
| 2012/0306392 A1* | 12/2012 | Young | H05B 33/0809 315/192 |
| 2013/0042057 A1* | 2/2013 | Sinclair | G06F 3/061 711/103 |
| 2013/0285699 A1 | 10/2013 | McWilliams et al. | |
| 2013/0326164 A1* | 12/2013 | Jeddeloh | G06F 13/1642 711/154 |
| 2014/0189421 A1* | 7/2014 | Werner | G06F 11/2056 714/6.21 |
| 2014/0219021 A1* | 8/2014 | Trantham | G11C 5/143 365/185.04 |
| 2014/0281599 A1* | 9/2014 | Grimsrud | G06F 1/3287 713/320 |
| 2015/0006811 A1* | 1/2015 | Uehara | G06F 12/0866 711/113 |
| 2015/0155050 A1* | 6/2015 | Trantham | G11C 16/3418 365/185.03 |
| 2015/0242151 A1* | 8/2015 | Makuni | G06F 12/0246 711/103 |
| 2015/0253998 A1* | 9/2015 | Park | G06F 12/0246 711/103 |
| 2015/0268872 A1* | 9/2015 | Ding | G06F 3/0616 711/103 |
| 2015/0277799 A1* | 10/2015 | Keeler | G06F 3/061 711/103 |
| 2015/0309927 A1* | 10/2015 | Sinclair | G06F 3/061 711/103 |
| 2015/0309933 A1* | 10/2015 | Nellans | G06F 12/0804 711/103 |
| 2015/0372455 A1* | 12/2015 | Nam | H01S 5/3223 372/45.01 |
| 2017/0033782 A1* | 2/2017 | Shifren | H03K 17/041 |
| 2017/0045905 A1* | 2/2017 | Sandhu | G05F 3/08 |
| 2017/0047115 A1* | 2/2017 | Aitken | G11C 13/0007 |
| 2017/0047116 A1* | 2/2017 | Sandhu | G11C 13/0007 |
| 2017/0047919 A1* | 2/2017 | Sandhu | H03K 17/14 |
| 2017/0069378 A1* | 3/2017 | Shifren | G11C 13/0069 |
| 2017/0084331 A1* | 3/2017 | Bhavnagarwala | G11C 13/0002 |
| 2017/0099049 A1* | 4/2017 | Sandhu | H03K 17/687 |

OTHER PUBLICATIONS

Webopedia, "SOC", Aug. 3, 2004, pp. 1-2, https://web.archive.org/web/20040803113823/http://www.webopedia.com/TERM/S/SoC.html.*

Sebastian Anthony, "SOC vs. CPU—The Battle for the Future of Computing", Apr. 19, 2012, pp. 1-17, https://www.extremetech.com/computing/126235-soc-vs-cpu-the-battle-for-the-future-of-computing.*

Microsoft, "Computer Dictionary", Fifth Edition, 2002, p. 488.*

Erwin J. Prinz, "Nonvolatile Memories for 90nm Soc and Beyond", Mar. 17, 2003, EE Times, pp. 1-4, https://www.eetimes.com/document.asp?doc_id=1201899 (Year: 2003).*

PCT/GB2016/053596: International Search Report and Written Opinion, dated Feb. 2, 2017, 10 pages.

PCT/GB2016/053596: Application as filed on Nov. 18, 2016, 48 pages.

Pelley, Chen and Wenisch, "Memory Persistency", ISCA'14 Proceeding of the 41$^{st}$ annual international symposium on Computer architecture, pp. 265-276, IEEE Press, Pisquateway NJ, USA.

Narayanan and Hodson, "Whole-System Persistence", ASPLOT'12, Proceedings of the seventeenth international conference on Architectural Support for Programming Languages and Operating Systems, pp. 401-410, ACM, New York NY, USA.

Lu, Shu, Sun and Mutlu, "Loose-Ordering Consistency for Persistent Memory", 32$^{nd}$ IEEE International Conference on Computer Design, (ICCD), 2014, 8 pages.

Lee, Doh, Choi, Lee, Noh, "Write-Aware Buffer Cache Management Scheme for Nonvolatile Ram", ACST'07 Proceedings of the third conference on IASTED International Conference Advances in Computer Science and Technology, pp. 29-35, ACTA Press, Anaheim CA, USA.

PCT/GB2016/053596: IPRP, dated May 31, 2018, 10 pages.

* cited by examiner

MEMORY CONTROLLER WITH NON-VOLATILE BUFFER FOR PERSISTENT MEMORY OPERATIONS

BACKGROUND

Field

Subject matter disclosed herein may relate to buffers, and may relate more particularly to non-volatile buffers for memory operations.

Information

Integrated circuit devices, such as electronic switching devices, for example, may be found in a wide range of electronic device types. For example, memory and/or logic devices may incorporate electronic switches that may be used in computers, digital cameras, cellular telephones, tablet devices, personal digital assistants, etc. Factors related to electronic switching devices, such as may be incorporated in memory, buffer, and/or logic devices, that may be of interest to a designer in considering suitability for any particular application may include physical size, storage density, operating voltages, and/or power consumption, for example. Other example factors that may be of interest to designers may include cost of manufacture, ease of manufacture, scalability, and/or reliability. Also, there appears to be an ever increasing need for memory, buffer, and/or logic devices that exhibit characteristics of lower power and/or higher speed, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
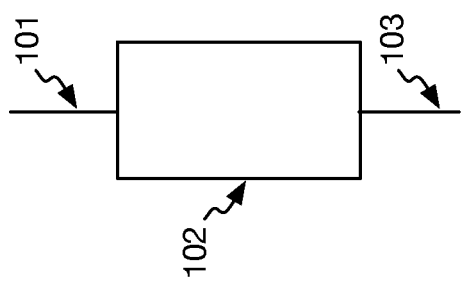
FIG. 1a shows block diagram of an example embodiment of a correlated electron switch device comprising a correlated electron material, in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

As utilized herein, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, digital content provided to a user in a form so that the user is able to perceive the underlying digital content itself (e.g., hear audio or see images, as examples) is referred to, with respect to the user, as 'consuming' digital content, 'consumption' of digital content, 'consumable' digital content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, digital content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to digital content, such as digital content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Particular aspects of the present disclosure incorporate correlated electron material (CEM) to form a correlated electron switch (CES), such as, for example, in memory, buffer, and/or logic devices. CES devices may also be utilized in a wide range of other electronic circuit types, such as, for example, filter circuits, data converters, phase locked loop circuits, and high-speed transceivers, although the scope of claimed subject matter is not limited in scope in these respects. In this context, a CES may exhibit a substantially abrupt conductor/insulator transition arising from electron correlations rather than solid state structural phase changes (e.g., crystalline/amorphous in phase change memory (PCM) devices or filamentary formation and conduction in resistive RAM devices). In one aspect, a substantially abrupt conductor/insulator transition in a CES may be responsive to a quantum mechanical phenomenon, in contrast to melting/solidification or filament formation, for example. Such a quantum mechanical transition between conductive and insulative states, and/or between first and second impedance states, in a CES may be understood in any one of several aspects. As used herein, the terms "conductive state", "lower impedance state", and/or "metal state" may be interchangeable, and/or may at times be referred to as a "conductive/lower impedance state." Similarly, the terms "insulative state" and "higher impedance state" may be used interchangeably herein, and/or may at times be referred to as an "insulative/higher impedance state."

In an aspect, a quantum mechanical transition of correlated electron switch material between an insulative/higher impedance state and a conductive/lower impedance state may be understood in terms of a Mott transition. In a Mott transition, a material may switch from an insulative/higher impedance state to a conductive/lower impedance state if a Mott transition condition occurs. The Mott criteria is defined by $(n_C)1/3$ a≈0.26, where $n_C$ is a concentration of electrons and "a" is the Bohr radius. When a critical carrier concentration is achieved such that the Mott criteria is met, the Mott transition will occur and the state of the CES will change from a higher resistance/higher capacitance state (that is, an insulative/higher impedance state) to a lower resistance/lower capacitance state (that is, a conductive/lower impedance state).

In another aspect, the Mott transition is controlled by a localization of electrons. When carriers are localized, the strong coulomb interaction between the electrons splits the bands of the CEM to create an insulator. When electrons are no longer localized, the weak coulomb interaction dominates and the band splitting is removed, resulting in a metal (conductive) band. This is sometimes explained as a "crowded elevator" phenomenon. While an elevator has only a few people in it, the people can move around easily, which is analogous to a conductive/lower impedance state. While the elevator reaches a certain concentration of people, on the other hand, the people can no longer move, which is analogous to the insulative/higher impedance state. However, it should be understood that this classical explanation provided for illustrative purposes, like all classical explanations of quantum phenomenon, is only an incomplete analogy, and that claimed subject matter is not limited in this respect.

Further, in an embodiment, switching from an insulative/higher impedance state to a conductive/lower impedance state may bring about a change in capacitance in addition to a change in resistance. For example, a CES may include the property of variable resistance together with the property of variable capacitance. That is, impedance characteristics of a CES device may include both resistive and capacitive components. For example, in a metal state, a CEM may have substantially zero electric field, and therefore substantially zero capacitance. Similarly, in an insulative/higher impedance state (in which electron screening may be very imperfect due to lower density of free electrons), an external electric field may be capable of penetrating the CEM and therefore the CEM will have capacitance due to a physical change in the dielectric function of the CEM. Thus, for example, a transition from an insulative/higher impedance state to a conductive/lower impedance state in a CES may result in changes in both resistance and capacitance, in an aspect.

In an embodiment, a CES device may switch impedance states responsive to a Mott-transition in a majority of the volume of the CEM of a CES device. In an embodiment, a CES device may comprise a "bulk switch." As used herein, the term "bulk switch" refers to at least a majority volume of a CEM of a CES device switching impedance states, such as responsive to a Mott-transition. For example, in an embodiment, substantially all of a CEM of a CES device may switch from an insulative/higher impedance state to a conductive/lower impedance state or from a conductive/lower impedance state to an insulative/higher impedance state responsive to a Mott-transition. In an aspect, a CEM may comprise one or more transition metal oxides, one or more rare earth oxides, one or more oxides of one or more f-block elements of the periodic table, one or more rare earth transitional metal oxide perovskites, yttrium, and/or ytterbium, although claimed subject matter is not limited in scope in this respect. In an embodiment, a device, such as CES device, may comprise CEM including one or more materials selected from a group comprising aluminum, cadmium, chromium, cobalt, copper, gold, iron, manganese, mercury, molybdenum, nickel, palladium, rhenium, ruthenium, silver, tin, titanium, vanadium, and zinc (which may be linked to a cation such as oxygen or other types of ligands), or combinations thereof, although claimed subject matter is not limited in scope in this respect.

FIG. 1a shows an example embodiment 100 of a CES device comprising CEM, such as material 102, sandwiched between conductive terminals, such as conductive terminals 101 and 103. In an embodiment, a CES device, such as CES device 100, may comprise a variable impeder device. As utilized herein, the terms "correlated electron switch" and "variable impeder" may be interchangeable. At least in part through application of a critical voltage and a critical current between the terminals, such as between conductive terminals 101 and 103, the CEM, such as material 102, may transition between the aforementioned conductive/lower impedance state and insulative/higher impedance state. As mentioned, CEM, such as material 102, in a variable impeder device, such as CES device 100, may transition between a first impedance state and a second impedance state due to a quantum mechanical transition of the correlated electron switch material as a result an applied critical voltage and an applied critical current, as described in more detail below. Also, as mentioned above, a variable impeder device, such as variable impeder device 100, may exhibit properties of both variable resistance and variable capacitance.

In a particular embodiment, a variable impeder device, such as CES device 100, may comprise a CEM that may transition between or among a plurality of detectable impedance states based, at least in part, on a transition of at least a majority portion of the CEM between an insulative/higher impedance state and a conductive/lower impedance state due to a quantum mechanical transition of the correlated electron switch material. For example, in an embodiment, a CES device may comprise a bulk switch, in that substantially all of a CEM of a CES device may switch from an insulative/higher impedance state to a conductive/lower impedance state or from a conductive/lower impedance state to an insulative/higher impedance state responsive to a Mott-transition. In this context, an "impedance state" means a detectable state of a variable impeder device that is indicative of a value, symbol, parameter and/or condition, just to provide a few examples. In one particular embodiment, as described below, an impedance state of a CES device may be detected based, at least in part, on a signal detected on terminals of the CES device in a read and/or sense operation. In another particular embodiment, as described below, a CES device may be placed in a particular impedance state to represent or store a particular value, symbol, and/or parameter, and/or to achieve a particular capacitance value for the CES device by application of one or more signals across terminals of the CES device in a "write" and/or "program" operation, for example. Of course, claimed subject matter is not limited in scope to the particular example embodiments described herein.

Figure 1B:
FIG. 1b depicts an example symbol for a correlated electron switch.

FIG. 1b depicts an example symbol 110 that may be utilized, for example, in electrical circuit schematic diagrams to notate a CES/variable impeder device. Example symbol 110 is meant to remind the viewer of the variable resistance and variable capacitance properties of a CES/variable impeder device, such as CES device 100. Example symbol 110 is not meant to represent an actual circuit diagram, but is merely meant as an electrical circuit diagram symbol. Of course, claimed subject matter is not limited in scope in these respects.

Figure 2:
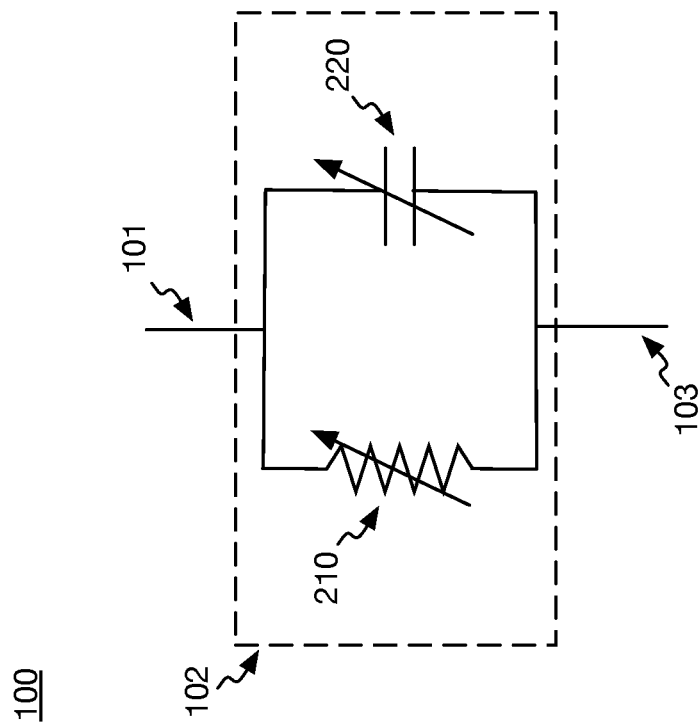
FIG. 2 is a schematic diagram of an equivalent circuit of a correlated electron switch, in accordance with an embodiment.

FIG. 2 depicts a schematic diagram of an equivalent circuit of an example CES/variable impeder device, such as CES device 100. As mentioned, a CES/variable impeder device may comprise characteristics of both variable resistance and variable capacitance. That is, the impedance characteristics for a CES/variable impeder device, such as CES device 100, may depend at least in part on the resistance and capacitance characteristics of the device. For example, an equivalent circuit for a variable impeder device may, in an embodiment, comprise a variable resistor, such as variable resistor 210 in parallel with a variable capacitor, such as variable capacitor 220. Of course, although a variable resistor 210 and variable capacitor 220 are depicted in FIG. 2 as comprising discrete components, a variable impeder device, such as CES 100, may comprise a substantially homogenous CEM, such as CEM 102, wherein the CEM comprises characteristics of variable capacitance and variable resistance.

Table 1 below depicts an example truth table for an example variable impeder device, such as CES device 100.

TABLE 1

Correlated Electron Switch Truth Table

| Resistance | Capacitance | Impedance |
|---|---|---|
| $R_{high}(V_{applied})$ | $C_{high}(V_{applied})$ | $Z_{high}(V_{applied})$ |
| $R_{low}(V_{applied})$ | $C_{low}(V_{applied})$~0 | $Z_{low}(V_{applied})$ |

In an embodiment, example truth table 120 shows that a resistance of a variable impeder device, such as CES device 100, may transition between a lower resistance state and a higher resistance state that is a function, at least in part, of a voltage applied across the CEM. In an embodiment, a resistance of a lower resistance state may be 10-100,000 times lower than a resistance of a higher resistance state, although claimed subject matter is not limited in scope in this respect. Similarly, example truth table 120 shows that a capacitance of a variable impeder device, such as CES device 100, may transition between a lower capacitance state, which for an example embodiment may comprise approximately zero, or very little, capacitance, and a higher capacitance state that is a function, at least in part, of a voltage applied across the CEM. Also, as seen in Table 1, a variable impeder device transition from a higher resistance/higher capacitance state to a lower resistance/lower capacitance state may be represented as a transition from a higher impedance state to a lower impedance state. Similarly, a transition from a lower resistance/lower capacitance state to a higher resistance/higher capacitance state may be represented as a transition from a lower impedance state to a higher impedance state.

It should be noted that a variable impeder, such as CES 100, is not a resistor, but rather comprises a device having properties of both variable capacitance and variable resistance. In an embodiment, resistance and/or capacitance values, and therefore impedance values, depend, at least in part, on an applied voltage.

Figure 3:
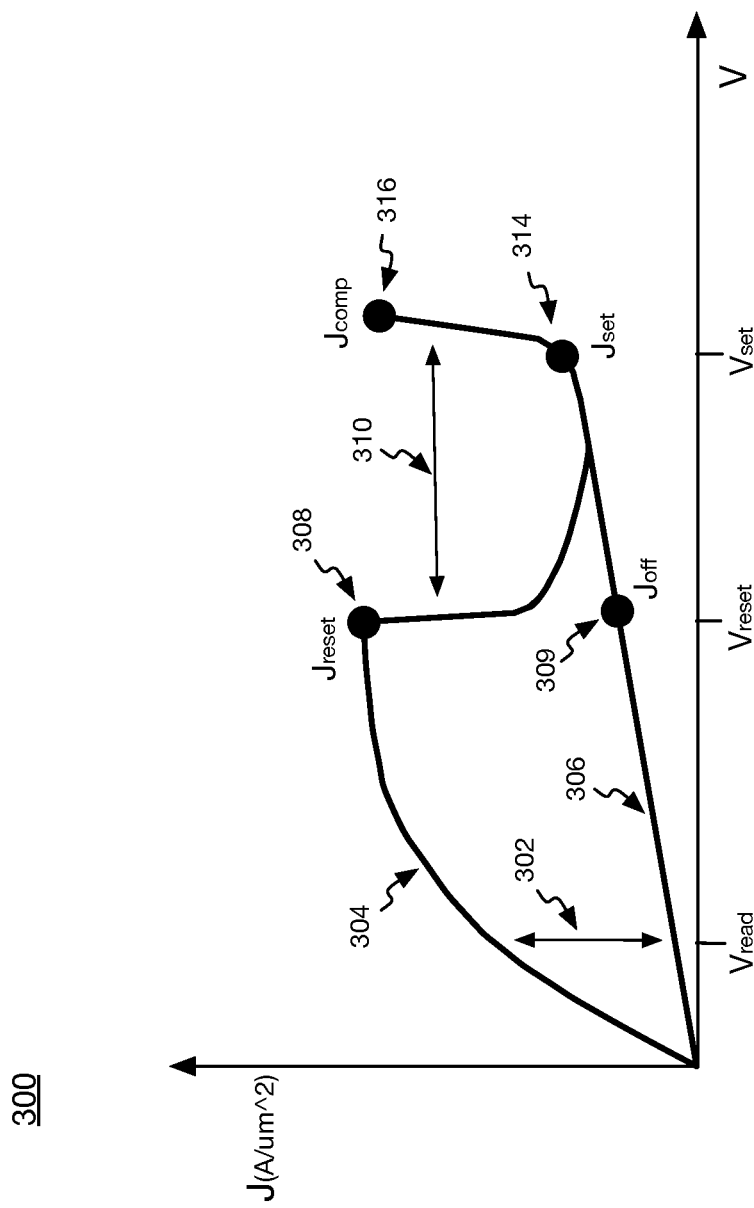
FIG. 3 shows a plot of current density versus voltage for a correlated electron switch, in according to an embodiment.

FIG. 3 shows a plot of current density versus voltage across electrically conductive terminals, such as electrically conductive terminals 101 and 103, for a CES device, such as example CES device 100, according to an embodiment. Based, at least in part, on a voltage applied to terminals of a variable impeder device (e.g., in a write operation), such as variable impeder device 100, a CEM, such as CEM 102, may be placed in a conductive/lower impedance state or an insulative/higher impedance state. For example, application of a voltage $V_{reset}$ and current density $J_{reset}$ may place the CES device in an insulative/higher impedance state, and application of a voltage $V_{set}$ and a current density $J_{set}$ may place the CES device in a conductive/lower impedance state. That is, a "set" condition may place a variable impeder device, such as CES device 100, into a conductive/lower impedance state, and a "reset" condition may place a variable impeder device, such as CES device 100, into an insulative/higher impedance state, in an embodiment. Following placement of the CES device in a lower impedance state or a higher impedance state, the particular state of the CES device may be detected at least in part by application of a voltage $V_{read}$ (e.g., in a read operation) and detection of a current or current density at terminals, such as electrically conductive terminals 101 and 103, of a variable impeder device, such as CES device 100.

In an embodiment, a CEM of a CES device may include, for example, any TMO, such as, for example, peroskovites, Mott insulators, charge exchange insulators, and/or Anderson disorder insulators. In a particular embodiment, a CES device may be formed from materials such as nickel oxide, cobalt oxide, iron oxide, yttrium oxide and peroskovites such as Cr doped strontium titanate, lanthanum titanate, and the manganite family including praesydium calcium manganite, and praesydium lanthanum manganite, to provide a few examples. In an embodiment, oxides incorporating elements with incomplete d and f orbital shells may exhibit sufficient impedance switching properties for use in a CES device. In an embodiment, a CES may be prepared without electroforming. Other embodiments may employ other transition metal compounds without deviating from claimed subject matter. For example, {M(chxn)$_2$Br}Br$_2$ where M may comprise Pt, Pd, or Ni, and chxn comprises 1R,2R-cyclohexanediamine, and other such metal complexes may be used without deviating from the scope of claimed subject matter.

In one aspect, a CES device, such as CES 100 of FIG. 1a, for example, may comprise materials that comprise TMO metal oxide variable impedance materials, though it should be understood that these are exemplary only, and are not intended to limit the scope of claimed subject matter. Particular implementations may employ other variable impedance materials as well. Nickel oxide, NiO, is disclosed as one particular TMO. NiO materials discussed herein may be doped with extrinsic ligands, which may stabilize variable impedance properties by passivating the interfacing and allowing for adjustable voltages and impedances, in an embodiment. In a particular embodiment, NiO variable impedance materials disclosed herein may include a carbon containing ligand, which may be indicated by NiO(C$_x$). Here, one skilled in the art may determine a value of x for any specific carbon containing ligand and any specific combination of carbon containing ligand with NiO simply by balancing valences, in an embodiment. In another particular example embodiment, NiO doped with extrinsic ligands may be expressed as NiO(L$_x$), where L$_x$ is a ligand element or compound and x indicates a number of units of the ligand for one unit of NiO. One skilled in the art may determine a value of x for any specific ligand and any specific combination of ligand with NiO or any other transition metal simply by balancing valences, in an embodiment.

In an embodiment, CES devices may be initially manufactured in a conductive/lower impedance state. Also, in an embodiment, CES devices may be non-volatile, in that CES devices may maintain respective impedance states until further programming is performed. For example, according to an embodiment, if sufficient bias is applied (e.g., exceeding a band-splitting potential) and the aforementioned Mott condition is met (injected electron holes=the electrons in the switching region), the CES device may rapidly switch from a conductive/lower impedance state to an insulator state via the Mott transition. This may occur at point 308 of the plot in FIG. 3. At this point, electrons are no longer screened and become localized. This correlation splits the bands to form an insulator. While the CEM of the CES device is still in the insulative/higher impedance state, current may generated by transportation of holes. If enough bias is applied across terminals of the CES device, electrons may be injected into a metal-insulator-metal (MIM) diode over the potential barrier of the MIM device. If enough electrons have been injected and enough potential is applied across terminals to achieve a set condition, an increase in electrons may screen electrons and remove a localization of electrons, which may collapse the band-splitting potential forming a metal, thereby placing the CES device in a conductive/lower impedance state.

According to an embodiment, current in a CEM of a CES device may be controlled by an externally applied "compliance" condition determined based, at least in part, on the external current limited during a write operation to achieve a set condition to place the CES device in a conductive/lower impedance state. This externally applied compliance current also sets the subsequent reset condition current density requirement. As shown in the particular implementation of FIG. 3, a current density $J_{comp}$ applied during a write operation at point 316 to place the CES device in a conductive/lower impedance state may determine a compliance condition for placing the CES in an insulative/higher impedance state in a subsequent write operation. As shown, the CEM of the CES device may be subsequently placed in an insulative/higher impedance state by application of a current density $J_{reset} \geq J_{comp}$ at a voltage $V_{reset}$ at point 308, wherein $J_{comp}$ may be externally applied, in an embodiment.

A compliance current, such as an externally applied compliance current, therefore may set a number of electrons in a CEM of a CES device which are to be "captured" by holes for the Mott transition. In other words, a current applied in a write operation to place a CES device in a conductive/lower impedance state may determine a number of holes to be injected to the CEM of the CES device for subsequently transitioning the CES device to an insulative/higher impedance state. As discussed more fully below, a compliance current may be applied dynamically.

As pointed out above, a transition to an insulative/higher impedance state may occur in response to a Mott transition at point 308. As pointed out above, such a Mott transition may occur at a condition in a CEM of a CES device in which a concentration of electrons n equals a concentration of electron holes p. This condition occurs when the following Mott criteria is met, as represented by expression (1) as follows:

$$\lambda_{TF} n^{\frac{1}{3}} = C \sim 0.26 \qquad (1)$$
$$n = \left(\frac{C}{\lambda_{TF}}\right)^3$$

where:
$\lambda_{TF}$ is a Thomas Fermi screening length; and
C is a constant which equals approximately 0.26 for the Mott transition.

According to an embodiment, a current or current density in a region 304 of the plot shown in FIG. 3 may exist in response to an injection of holes from a voltage signal applied across terminals, such as terminals 101 and 103, of a variable impeder device, such as CES device 100. Here, injection of holes may meet a Mott transition criterion for the conductive to insulator transition at current $I_{MI}$ as a critical voltage $V_{MI}$ is applied across terminals, such as terminal 101 and 103, of a variable impeder device, such as CES device 100. This may be modeled according to expression (2) as follows:

$$I_{MI}(V_{MI}) = \frac{dQ(V_{MI})}{dt} \approx \frac{Q(V_{MI})}{t} \qquad (2)$$
$$Q(V_{MI}) = qn(V_{MI})$$

Where $Q(V_{MI})$ is the charge injected (hole or electron) and is a function of the applied voltage. As used herein, the notation "MI" signifies a metal-to-insulator transition, and the notation "IM" signifies an insulator-metal transition. That is, "$V_{MI}$" refers to a critical voltage and "$I_{MI}$" refers to a critical current to transition a CEM from a conductive/lower impedance state to an insulative/higher impedance state. Similarly, "$V_{IM}$" refers to a critical voltage and "$I_{IM}$" refers to a critical current to transition a CEM from an insulative/higher impedance state to a conductive/lower impedance state.

Injection of holes to enable a Mott transition may occur between bands and in response to critical voltage $V_{MI}$ and critical current $I_{MI}$. By equating electron concentration n with the needed charge concentration to result in a Mott transition by holes injected by $I_{MI}$ in expression (2) according to expression (1), a dependency of such a critical voltage $V_{MI}$ on Thomas Fermi screening length $\lambda_{TF}$ may be modeled according to expression (3) as follows:

$$I_{MI}(V_{MI}) = \frac{Q(V_{MI})}{t} = \frac{qn(V_{MI})}{t} = \frac{q}{t}\left(\frac{C}{\lambda_{TF}}\right)^3 \qquad (3)$$
$$J_{reset}(V_{MI}) = J_{MI}(V_{MI}) = \frac{I_{MI}(V_{MI})}{A_{CEM}} = \frac{q}{A_{CEM} t}\left(\frac{c}{\lambda_{TF}(V_{MI})}\right)^3$$

Wherein $A_{CEM}$ is a cross-sectional area of a CEM, such as CEM 102, of a variable impeder device, such as CES device 100, and wherein $J_{reset}(V_{MI})$, depicted at point 308 of example plot 300, is a current density through the CEM, such as CEM 102, to be applied to the CEM at a critical voltage $V_{MI}$ to place the CEM of the CES device in an insulative/higher impedance state. In an embodiment, a CEM may be switched between a conductive/lower impedance state and an insulative/higher impedance state at least in part by a disproportionation reaction.

According to an embodiment, a CEM, such as CEM 102, of a variable impeder device, such as CES device 100, may be placed in a conductive/lower impedance state (e.g., by transitioning from an insulative/higher impedance state) by injection of a sufficient number of electrons to satisfy a Mott transition criteria.

In transitioning a CEM of a CES device to a conductive/lower impedance state, as enough electrons have been injected and the potential across terminals of the variable impeder device overcomes a critical switching potential (e.g., $V_{set}$), injected electrons begin to screen and unlocalize double-occupied electrons to reverse a disproportion reaction and closing the bandgap. A current density $J_{set}(V_{MI})$, depicted at point 314 of FIG. 3, for transitioning the CEM of the CES device to the conductive/lower impedance state in a metal-insulator Mott transition at a critical voltage $V_{MI}$ enabling transition to the conductive/lower impedance state may be represented according to expressions (4) as follows:

$$I_{MI}(V_{MI}) = \frac{dQ(V_{MI})}{dt} \approx \frac{Q(V_{MI})}{t} \qquad (4)$$
$$Q(V_{MI}) = qn(V_{MI})$$
$$I_{MI}(V_{MI}) = \frac{Q(V_{MI})}{t} = \frac{qn(V_{MI})}{t} = \frac{q}{t}\left(\frac{C}{a_B}\right)^3$$
$$J_{set}(V_{IM}) = J_{injection}(V_{IM}) = J_{IM}(V_{IM}) = \frac{I_{IM}(V_{IM})}{A_{CEM}} = \frac{q}{A_{CEM} t}\left(\frac{c}{a_B}\right)^3$$

where:
$a_B$ comprises a Bohr radius.

According to an embodiment, a "read window" 302 for detecting a memory state of a CES device in a read operation may be set out as a difference between a portion 306 the plot of FIG. 3 while the CEM of the CES device is in an insulative/higher impedance state and a portion 304 of the plot FIG. 3 while the CEM of the CES device is in a conductive/lower impedance state at a read voltage $V_{read}$. In a particular implementation, read window 302 may be used to determine the Thomas Fermi screening length $\lambda_{TF}$ of a CEM, such as correlated electron switch material 102, of a variable impeder device, such as CES device 100. For example, at a voltage $V_{reset}$, current densities $J_{reset}$ and $J_{set}$ may be related to according to expression (5) as follows:

$$\lambda_{TF}(@V_{reset}) = a_B \left(\frac{J_{reset}}{J_{off}}\right)^{\frac{1}{3}} \qquad (5)$$

wherein $J_{off}$ represents a current density of a CEM in an insulative/higher impedance state at $V_{reset}$. See, for example, point 309 of FIG. 3.

In another embodiment, a "write window" 310 for placing a CEM of CES device in an insulative/higher impedance or conductive/lower impedance state in a write operation may be set out as a difference between $V_{reset}$ and $V_{set}$. Establishing $|V_{set}| > |V_{reset}|$ may enable a switch between the conductive/lower impedance and insulative/higher impedance state.

$V_{reset}$ may comprise approximately the band splitting potential caused by the correlation and $V_{set}$ may comprise approximately twice the band splitting potential, such that the read window may comprise approximately the band-splitting potential. In particular implementations, a size of write window 310 may be determined, at least in part, by materials and doping of the CEM of the CES device.

In an embodiment, a process for reading a value represented as an impedance state of a variable impeder device, such as CES device 100, may comprise a voltage being applied to a CEM of a CES device. At least one of a current and/or current density within a CEM of a CES device may be measured, and an impedance state of a CEM of a CES device may be determined, at least in part, on the measured current and/or current density, in an embodiment.

Additionally, in an embodiment, an impedance of an impedance state may depend at least in part on a combination of a capacitance and a resistance of a CEM of a CES device. In an embodiment, the determined impedance state may comprise one of a plurality of impedance states. A first impedance state may comprise a lower resistance and lower capacitance, and a second impedance state may comprise a higher resistance and a higher capacitance, for example. Also, in an embodiment, a ratio of the impedances of the plurality of impedance states may be proportional to a physical property of the CEM of the CES device. In an embodiment, the physical property of the CEM of the CES device may comprise at least one of a Thomas Fermi screening length and a Bohr radius. Further, in an embodiment, individual impedance states of the plurality of impedance states may be associated with a data value. Additionally, in an embodiment, a difference in current between a first impedance state and a second impedance state at a predetermined voltage provides an indication of a read window. However, claimed subject matter is not limited in scope in these respects.

In an embodiment, a plurality of electrons may be provided to a CEM of a CES device such that the CES enters a first impedance state. A plurality of holes may be provided to the CEM such that the CES enters a second impedance state. Also, in an embodiment, the plurality of electrons may cause a voltage across the CES to be greater than a set voltage threshold, and the plurality of holes may cause the voltage across the CES to be equal to or greater than a reset voltage threshold. Further, in an embodiment, a voltage across the CEM may cause a current density in the CEM to be equal to or greater than a set current density and/or a set current, and a voltage across the CEM may cause a current density in the CEM to be equal to or greater than a reset current density and/or a reset current.

Also, in an embodiment, a set voltage across the CEM and a set current density through a CEM of a CES device may be exceeded. Additionally, a reset voltage across a CEM and a reset current density through a CEM of a CES device may be exceeded. Further, in an embodiment, individual impedance states of a plurality of impedance states may be associated with a data value.

In an embodiment, at least one of a reset voltage, a set voltage, and a difference between the set voltage and the reset voltage are proportional to a physical property of a CEM of a CES device. A physical property of a CEM may include at least one of a strong electron potential due to localization, and/or a correlation of electrons, for example. Also, in an embodiment, a difference in the set voltage and the reset voltage may provide an indication of a size of at least one of a write/program window.

As mentioned above, a CES device, also referred to as a variable impeder device, such as CES 100, may be implemented in a wide range of electronic device types. For example, a variable impeder device, such as CES 100, may be utilized in logic circuits, memory circuits, filter circuits, etc. Generally speaking, a variable impeder device, such as CES 100, may be utilized in any circuit or device, presently existing or to exist in the future, that may benefit from the variable impeder device's various characteristics, including, for example, the variable impeder device's variable resistance and/or variable capacitance characteristics.

For example, in an embodiment, a CES device, such as CES 100, may be implemented in a memory and/or buffer storage cell, for example. In one or more embodiments, a CES memory and/or buffer may comprise: a variable impeder storage cell including a CES; a write circuit for placing the CES storage cell in a first impedance state or a second impedance state depending at least in part on signals provided to the memory and/or buffer; and a read circuit for sensing an impedance state of the CES storage cell and providing an electrical signal corresponding to the sensed state of the CES storage cell. In one aspect, an impedance of a second impedance state of a CES storage cell may be significantly greater than an impedance of a first impedance state of the CES storage cell. Also, in one or more embodiments, one or more CES devices, such as CES 100, may comprise one or more respective storage cells that may be implemented in a non-volatile write buffer, in an embodiment.

In one or more embodiments wherein a CES device is utilized, at least in part, as a memory cell and/or a storage cell for a buffer, advantages may be realized as compared to circuits incorporating conventional and/or prior memory, buffer, and/or storage cell technologies. For example, as a result of improved device reliability and/or improved endurance, needs for wear-leveling and/or error correcting circuitry may be reduced and/or eliminated, and/or costs may also be reduced. Additionally, because a wide range of metal and/or conductive materials that may be used to form contacts in a CES device, ease of manufacture may be greatly improved. Further, in an embodiment, processing temperatures may relatively low, making CES devices easier to process. Also, performance for a CES device may be extremely quick as compared to prior and/or conventional memory, buffer, and/or storage cell technologies due at least in part to switch events occurring in distances less than a Thomas Fermi screening length, for example. Additionally, the lack of a filament such as may be formed in some resistive memory technologies may lead to improved performance and/or reliability. Of course, these are merely example advantages that a CES device may have over prior and/or conventional memory and/or buffer storage technologies, and claimed subject matter is not limited in scope in these respects.

Computing devices and/or other electronic device types may incorporate a processor and a memory device, for example. In some devices, a memory controller may provide an interface between a processor and a memory device. A buffer, such as a write buffer, for example, may be incorporated into a memory controller in some devices. For example, a processor may execute an instruction to communicate digital content to a memory device. In executing a memory operation, such as a write operation, digital content may be communicated from a processor to a buffer, such as a write buffer, and the digital content may subsequently be communicated from the buffer to the memory device. In some systems, a response to a memory operation, such as a memory write operation, may be communicated between a memory controller and a processor once digital content associated with the memory operation has been communicated between the buffer and the memory device, and/or once the memory device has acknowledged receipt of the digital content.

Additionally, some write operations that may be executed by a processor may comprise persistent write operations. As used herein, a "persistent write operation" refers to a write operation directed to a "point of persistency" for a system. A "point of persistency" refers to a point in a system at which a persistent write operation is assured completion, assuming a normally functioning system, even in the event of an interruption of power to the system. For example, in some embodiments, a non-volatile storage device may represent a point of persistency. That is, in an embodiment, a persistent write operation may be said to reach a point of persistency in a system upon content associated with the persistent write operation being stored in a non-volatile storage device, for example.

Also, as used herein, a "non-volatile storage device" refers to a storage device that maintains signals and/or states comprising digital content stored in one or more storage cells in the absence of power to the storage device. For example, a "non-volatile memory device" refers to a memory device that maintains signals and/or states comprising stored digital content for later retrieval in the absence of power. In an embodiment, digital content may be communicated to a non-volatile memory device and signals and/or states comprising the digital content may be stored in the non-volatile memory device. Power may be removed from the non-volatile memory device, and at some point the power may be restored, for example. In an embodiment, at least in part in response to a restoration of power, digital content previously stored in the non-volatile memory device may be retrieved in the same state the digital content was in before removal of power.

In at least some systems, to execute a persistent write operation, content may be communicated from a processor to a write buffer, and the content may subsequently be communicated from the write buffer to a non-volatile memory device. In some systems, a response to a persistent write operation may be communicated between a memory controller and a processor once content associated with the write operation has been communicated between the write buffer and the non-volatile memory device, and/or once the non-volatile memory device has acknowledged receipt of the content. Of course, incurring latencies associated with waiting for a write buffer to communicate content of a persistent write operation from the write buffer to the non-volatile memory device, waiting for the non-volatile memory device to acknowledge receipt of the content, and/or waiting for the memory controller to signal completion of the persistent write operation may have a negative impact on system performance. Also, for at least some systems, a non-volatile memory device may be located "off-chip" from a memory controller. That is, in an embodiment, a memory controller and a non-volatile memory device may reside on separate integrated circuit die and/or separate integrated circuit devices.

In some systems, communication of digital content from an on-chip memory controller to an off-chip device may incur latencies due at least in part to interface issues. For example, digital content may be encoded into physical signals and/or states that may be communicated between a memory controller and a memory device, and the signals and/or states may be decoded at the memory device. Such encoding and/or decoding may introduce latencies, further negatively impacting system performance. Additionally, larger memories, such as some non-volatile memory devices, may digital store content in larger granularities, meaning that larger amounts of digital content may be moved to accommodate persistent write operations, perhaps further negatively impacting system performance. For some non-volatile memory devices, latency may include several hundred or even thousands of processor cycles, for example.

In some systems, a write buffer may maintain power for a relatively short period of time in the event that power is removed from the system to enable the write buffer to flush digital content to a non-volatile storage device before a voltage applied to the write buffer falls below a level required to maintain digital content in the write buffer. In some systems, a write buffer may represent a point of persistency, relying on the write buffer to complete the persistent write operation in the event power is removed from the system. As mentioned, a write buffer in some systems may have a voltage sufficient to maintain stored digital content applied for a relatively short period of time in the event power is removed from the system. In some systems, a battery may be used to provide temporary power to enable a write buffer to complete a persistent write operation. In other systems, a capacitor may be used to store sufficient energy to apply a sufficient voltage long enough for the write buffer to complete the persistent write operation. Of course, implementation of a battery and/or capacitor sufficient to maintain power to a write buffer long enough for the write buffer to flush its contents to a memory device may result in increased complexity, cost, and/or other disadvantages, for example.

Figure 4:
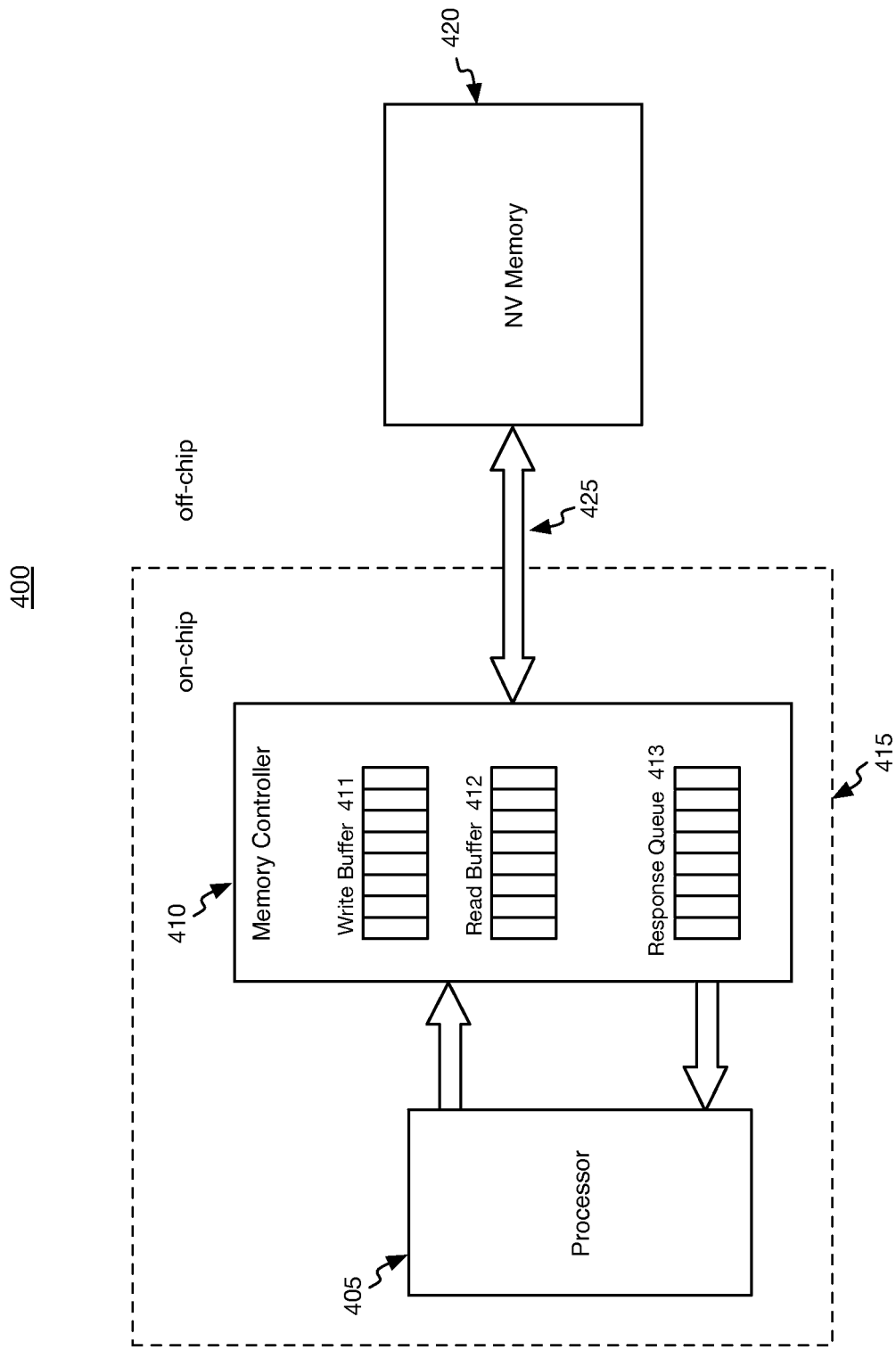
FIG. 4 is a schematic diagram depicting an example system including an example memory controller and an example memory device, in accordance with an embodiment.

FIG. 4 is a schematic diagram depicting an example embodiment 400 of a system including an example memory controller, such as memory controller 410, and an example memory device, such as non-volatile memory device 420. In an embodiment, the term "memory controller" refers to an electronic circuit and/or device to facilitate communication, direct and/or indirect, between one or more processors, such as processor 405, and one or more memory devices, such as non-volatile memory device 420. In an embodiment, a memory controller, such as memory controller 410, may reside "on-chip." As utilized herein, the term "on-chip" as applied to a memory controller, such as memory controller 410, refers to residing on an integrated circuit die, such as integrated circuit die 415. In an embodiment, a memory controller, such as memory controller 410, may reside "on-chip" with a processor, such as processor 405, although claimed subject matter is not limited in scope in this respect. Also, in an embodiment, a non-volatile memory device, such as non-volatile memory device 420, may reside "off-chip" which, for example, may include residing on a separate integrated circuit die and/or in a separate integrated circuit package from an integrated circuit die, such as integrated circuit die 415, comprising a memory controller, such as memory controller 410. As mentioned, communicating digital content, such as from an on-chip source to an off-chip destination, for example, may incur latencies related to interface issues. For example, latencies related to interface issues may be incurred, at least in part, due to the encoding of digital content into physical signals and/or states and/or due to the decoding of signals and/or states. For example, and on-chip memory controller, such as memory controller 410, may communicate digital content to an off-chip non-volatile memory device, such as non-volatile memory device 420, over an interface, such as interface 425. However, although memory controller 410 and non-volatile memory device 420 of example system 400 are described as being located on separate integrated circuit die and/or in separate semiconductor device packages, other embodiments may implement memory controller 410 and non-volatile memory device 420 on the same integrated circuit die and/or in the same semiconductor device package.

In an embodiment, a memory controller, such as memory controller 410, may include a write buffer, such as write buffer 411, and a read buffer, such as read buffer 412. Memory controller 410 may also include a response queue, such as response queue 413, in an embodiment. In an embodiment, a write buffer, such as write buffer 411, may comprise a non-volatile write buffer, for example. In an embodiment, a non-volatile write buffer may be referred to as a persistent write buffer. For example, a non-volatile write buffer, such as persistent write buffer 411, may incorporate one or more CES devices as storage cells. However, although example embodiments described herein may utilize CES devices as storage cells for a non-volatile write buffer, other embodiments may utilize other non-volatile store cell technologies. For example, in an embodiment, a buffer, such as write buffer 411, may be implemented using one or more non-volatile storage cell technologies that do not rely on application of power, such as via a battery and/or external source, for example, to maintain signals and/or states stored in the buffer.

Utilization of CES devices, for example, as storage cells may exhibit several advantages over at least some other non-volatile memory technologies, in an embodiment. For example, as a result of improved device reliability and/or improved endurance, needs for wear-leveling and/or error correcting circuitry may be reduced and/or eliminated for CES devices, contrary to what may be the case with at least some other technologies. Also, performance for a CES device may be extremely quick as compared to at least some other storage cell technologies due at least in part to switch events occurring in distances less than a Thomas Fermi screening length, for example. Additionally, the lack of a filament such as may be formed in some resistive memory technologies may lead to improved performance and/or reliability. Of course, these are merely example advantages that a CES device may have over at least some other non-volatile storage cell technologies, and claimed subject matter is not limited in scope in these respects. Also, as mentioned previously, claimed subject matter is not restricted to the use of CES devices in non-volatile buffers, such as persistent write buffers, for example.

In an embodiment, a processor may execute a memory operation, such as a memory write operation. In an embodiment, a memory write operation may comprise a persistent write operation. To execute a persistent write operation, in an embodiment, a processor may communicate digital content associated with the persistent write operation to a non-volatile write buffer of a memory controller, such as persistent write buffer 411 of on-chip memory controller 410, for example. In an embodiment, a non-volatile write buffer, such as persistent write buffer 411, may represent a point of persistency for a system, such as example system 400. That is, even in the event of a removal of power from a system, such as example system 400, digital content associated with a persistent write operation stored in a buffer, such as persistent write buffer 411, may be maintained until power may be restored. In an embodiment, upon restoration of power, digital content associated with a persistent write operation stored in a non-volatile buffer, such as persistent write buffer 411, and not yet communicated to a non-volatile memory device, such as non-volatile memory device 420, may be communicated over an interface, such as interface 425, to a non-volatile memory device, such as non-volatile memory device 420.

Also, in an embodiment, a reply to a persistent write operation may be signaled to a processor, such as processor 405, at least in part in response to digital content associated with the persistent write operation being communicated from the processor, such as processor 405, to a persistent write buffer, such as persistent write buffer 411. For example, a reply to a persistent write operation may be signaled to a processor, such as processor 405, approximately as soon as digital content associated with the persistent write operation is stored in a persistent write buffer, such as persistent write buffer 411. In this manner, latencies related to interfacing with a non-volatile memory device, such as non-volatile memory device 420, may be reduced and/or avoided. In an embodiment, a reply to a processor, such as processor 405, may be placed in a response queue, such response queue 413, and the reply may subsequently be forwarded to a processor, such as processor 405. In an embodiment, a processor, such as processor 405, at least in part in response to obtaining a reply to a persistent write operation from a memory controller, such as memory controller 410, and/or from a buffer, such as response queue 413, may operate as though digital content associated with the persistent write operation has been stored in a non-volatile memory device, such as non-volatile memory device 420, for example, even in situations wherein the digital content has not yet been communicated to a non-volatile memory device, such as non-volatile memory device 420.

In an embodiment, by implementing a persistent write buffer, such as persistent write buffer 411, on the same integrated circuit die as a processor, for example, a point of persistency for a system, such as example system 400, may be located substantially adjacent to the processor. This is in contrast to other systems, wherein a point of persistency may be located farther away from a processor. For example, in some convention systems, a point of persistency may be represented by an off-chip non-volatile memory device, or a disk drive. As utilized herein, the term "substantially adjacent" with respect to a point of persistency refers to the point of persistency being located at a device, such as a persistent write buffer, for example, that is electrically connected to a processor without substantial intervening electronic devices and/or components. For example, a memory controller, such as memory controller 410 including persistent write buffer 411, may comprise a point of persistency substantially adjacent to a processor, such as processor 405, in that memory controller 410 is electrically connected to processor 405 without any substantially intervening electronic devices and/or components between memory controller 410 and processor 405, in an embodiment.

In an embodiment, positioning of the point of persistency closer to a processor may be made possible by implementing a higher performance, durable non-volatile storage cell, such as implemented in example persistent write buffer 411 utilizing CES devices, for example. In an embodiment, because the point of persistency may be located closer to a processor, such as approximately adjacent to a processor, a reply to a persistent write operation signaling completion of the persistent write operation may be communicated to the processor at least in part in response to digital content associated with the persistent write operation being stored in a persistent write buffer, such as persistent write buffer 411. In an embodiment, a reply to a persistent write operation signaling completion of the persistent write operation may be signaled to a processor, such as processor 405, at least in part by placing the reply in a response queue, such as response queue 413, without waiting for the digital content to be communicated to a non-volatile memory device, such as off-chip non-volatile memory device 420, and system performance may therefore be improved, for example.

As mentioned, a persistent write buffer, such as persistent write buffer 411 may represent a point of persistency substantially adjacent to a processor, such as processor 405, in an embodiment. For example, programmers may rely on digital content written to a persistent write buffer, such as written to persistent write buffer 411 via a persistent write operation executed by a processor, such as processor 405, to be stored persistently. That is, even in the event of a removal or interruption of power, digital content stored in a persistent write buffer, such as persistent write buffer 411, may remain valid. In an embodiment, persistent write operations that are in process and that have been signaled as complete to a processor, such as signaled complete to processor 405 via response queue 413, but that have not yet been communicated to a non-volatile memory device, such as non-volatile memory device 420, when power is removed may be communicated to a non-volatile memory, such as non-volatile memory device 420, at least in part in response to a restoration of power. In this manner, the integrity of the persistent write operation may be preserved, and programmers, for example, may be confident that digital content being written to a non-volatile memory device, such as non-volatile memory device 420, via a persistent write buffer, such as persistent write buffer 411, may not be lost in the event of a removal of power, in an embodiment. Read operations following a restoration of power may check a persistent write buffer, such as persistent write buffer 411, to determine whether digital content to be written to a memory device, such as non-volatile memory device 420, is still resident in a persistent write buffer, such as persistent write buffer 411 (i.e., has not yet been written to non-volatile memory device 420 from persistent write buffer 411), in an embodiment. Also, in an embodiment, digital content to be written to a memory device, such as non-volatile memory device 420, that is determined to still be resident in a persistent write buffer, such as persistent write buffer 411, following a restoration of power may be communicated between a buffer, such as persistent write buffer 411, and a non-volatile memory device, such as non-volatile memory device 420, for example.

Figure 5:
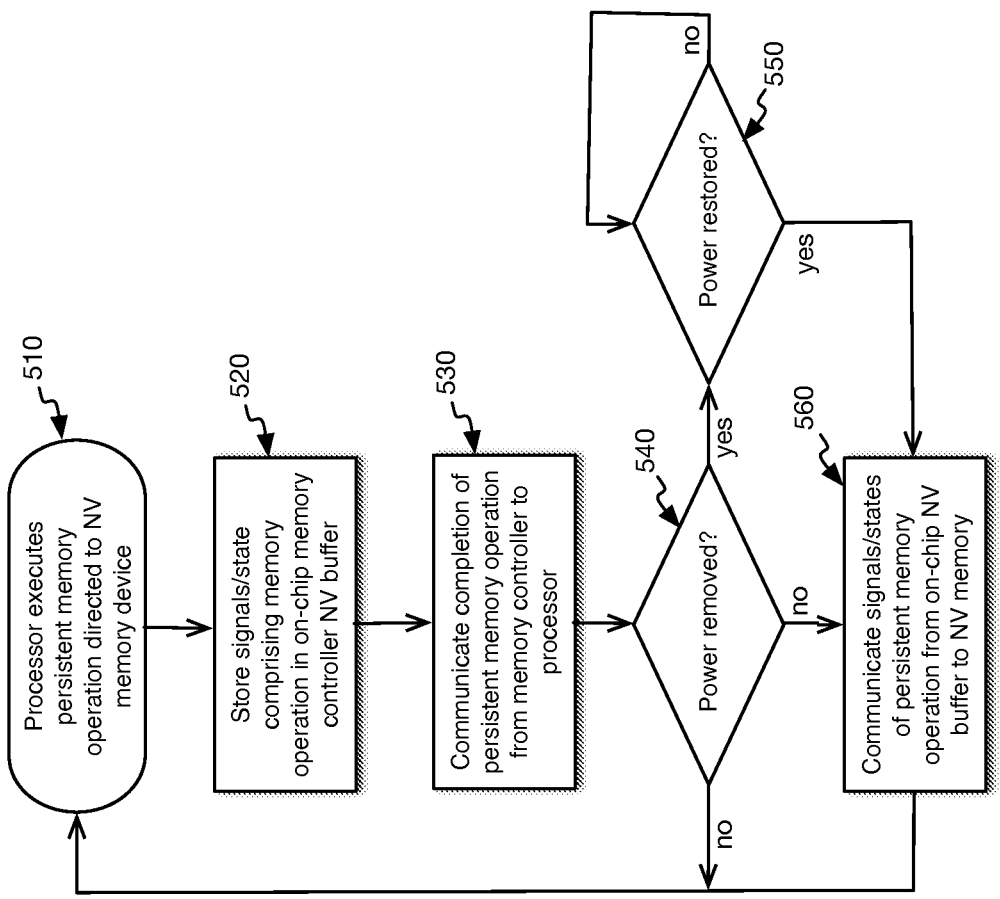
FIG. 5 is an illustration depicting an example process for buffering memory operations, in accordance with an embodiment.

FIG. 5 is an illustration depicting an example embodiment 500 of a process for buffering persistent write operations, in accordance with an embodiment. In an embodiment, a processor may execute a memory operation, such as a persistent write operation, for example, that may be directed at a non-volatile memory device, as depicted at block 510. In an embodiment, signals and/or states comprising digital content associated with a memory operation, such as a persistent write operation, may be stored in a buffer, such as a persistent write buffer, of an on-chip memory controller, as indicated at block 520, for example. Further, block 530 depicts that a completion of a memory operation, such as a persistent write operation, may be communicated from the memory controller to the processor, in an embodiment. Block 540 indicates that in the event power is maintained to a system, processing may return to block 510 wherein the processor may continue to execute operations, including additional persistent write operations, in an embodiment. Also, as indicated at block 560, for example, signals and/or states comprising digital content associated with a memory operation, such as a persistent write operation, may be communicated from an on-chip buffer, such as an on-chip persistent write buffer, to an off-chip non-volatile memory device, in an embodiment. In an embodiment, a processor may continue to execute operations, such as indicated at block 510, substantially concurrently with signals and/or states comprising digital content associated with a memory operation, such as a persistent write operation, being communicated from an on-chip buffer, such as an on-chip persistent write buffer, to an off-chip non-volatile memory device, as indicated at block 560, in an embodiment.

As also indicated at block 540, in the event power is removed from a system, for example, a determination may be made at block 550 as to whether power has been restored, in an embodiment. Also, in an embodiment, upon restoration of power, signals and/or states comprising digital content associated with a memory operation, such as a persistent write operation, may be communicated from an on-chip buffer, such as a persistent write buffer, to an off-chip non-volatile memory controller, as indicated at block 560, for example.

Embodiments in accordance with claimed subject matter may include all of blocks 510-560, less than blocks 510-560, or more than blocks 510-560. Further, the order of blocks 510-560 is merely an example order, and claimed subject matter is not limited in scope in these respects.

Figure 6:
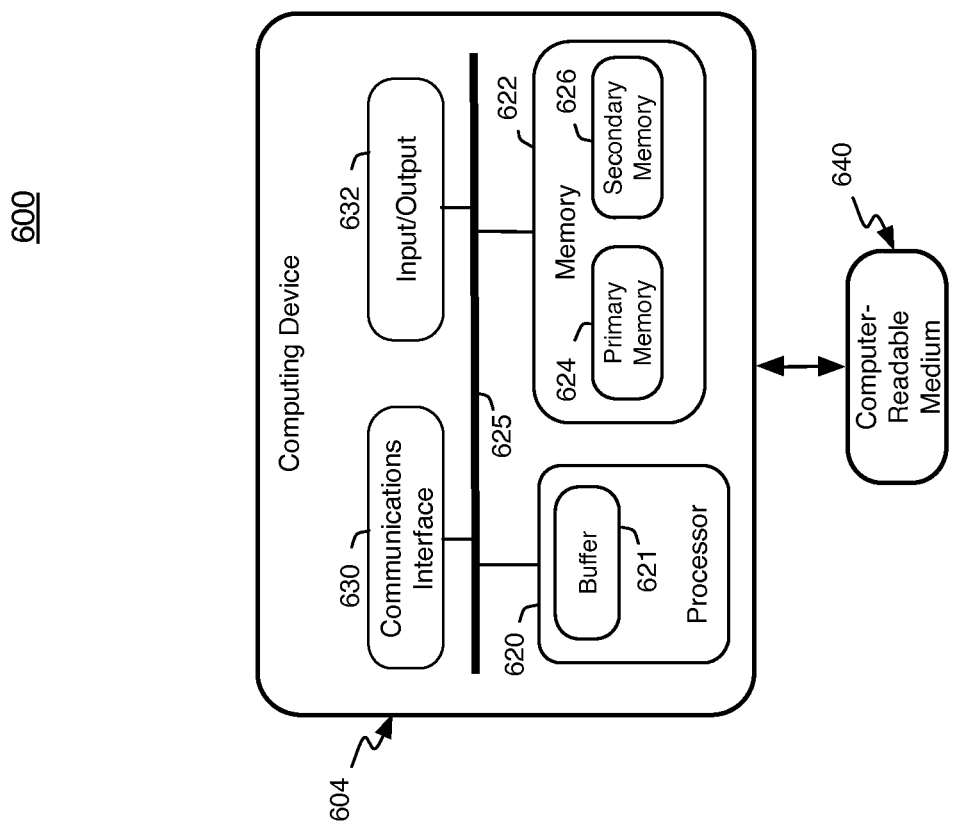
FIG. 6 is a schematic diagram depicting an example computing device, in accordance with an embodiment.

FIG. 6 is an illustration of an embodiment 600 of a system that may be employed, for example, in processor-buffer-memory type interactions, such as described infra. Example system 600 may comprise a computing device, such as computing device 604. Example computing device 604 may comprise a communications interface 630, a processor (e.g., processing unit) 620, including a write buffer 621, and a memory 622. In an embodiment, memory 622 may comprise primary memory 624 and secondary memory 626. Also, in an embodiment, memory 622, including one or more of primary memory 624 and secondary 626, may comprise a non-volatile memory. Communications interface 630, processor 620, and/or memory 622 may communicate by way of a communication bus, such as communication bus 625, for example. In FIG. 6, computing device 604 may represent one or more sources of analog, uncompressed digital, lossless compressed digital, and/or lossy compressed digital formats for digital content of various types, such as video, imaging, data, text, audio, etc. in the form physical states and/or signals, for example. Computing device 602 may communicate with one or more other computing devices (not shown) by way of a connection, such as an internet connection, via a network, for example. Although computing device 604 of FIG. 6 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 620 may be representative of one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, the like, or any combination thereof. In implementations, processor 620 may perform signal processing to manipulate signals and/or states, to construct signals and/or states, etc., for example. Also, in an embodiment, processor 620 may include a memory controller, including write buffer 621, for example, to interface with one or more memory devices, such as memory device 622. In an embodiment, write buffer 621 may comprise a persistent write buffer, similar to example persistent write buffers described herein. For example, persistent write buffer 621 may comprise one or more CES devices, in an embodiment. Also, in an embodiment, persistent write buffer 621 may represent a point of persistency substantially adjacent to processor 620. For example, as explained more fully above, programmers may rely on digital content written to persistent write buffer 621, such as via a persistent write operation executed by processor 620, to be stored persistently. That is, even in the event of a removal or interruption of power, digital content stored in persistent write buffer 621 will remain valid. Persistent write operations that are in process and that have been signaled as complete to processor 620 when power is removed may be transmitted to a non-volatile memory, such as memory 622, upon restoration of power. In this manner, the integrity of the persistent write operation may be preserved, and programmers may be confident that digital content being written to a non-volatile memory device via write buffer 621 will not be lost in the event of a removal of power, in an embodiment. Read operations following a restoration of power may check the write buffer to determine whether digital content to be written to a memory device, such as non-volatile memory device 622, is still resident in write buffer 621 (i.e., has not yet been written to memory 622 from write buffer 621).

In one or more embodiments, memory 622 may be representative of any storage mechanism. As mentioned, in one or more embodiments, memory 622 may comprise a non-volatile memory device, such as a Flash memory device, for example. In an embodiment, memory 620 may comprise, for example, primary memory 622 and secondary memory 626, additional memory circuits, mechanisms, or combinations thereof may be used. Memory 620 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 620 may be utilized to store a program. Processor 620 may also comprise a memory controller for accessing memory 622 and/or computer readable-medium 640 that may carry and/or make accessible digital content, which may include code, and/or instructions, for example, executable by processor 620 and/or some other unit, such as a controller and/or processor, capable of executing instructions, for example.

Under direction of processor 620, memory, such as memory cells storing physical states, representing, for example, a program, may be executed by processor 620 and generated signals may be transmitted via the Internet, for example. Processor 620 may also receive digitally-encoded signals from other computing devices.

As mentioned, computing device 604 may communicate with other computing devices via a network. In an embodiment, a network may comprise one or more network communication links, processes, services, applications and/or resources to support exchanging communication signals between a computing device, such as computing device 604, and another computing device, which may, for example, comprise one or more servers (not shown). By way of example, but not limitation, a network may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store digital content, such as measurements, text, data, images, video, audio, etc. in the form of signals and/or states. Thus, a computing device, in this context, may comprise hardware, software, firmware, or any combination thereof (other than software per se). Computing device 604, as depicted in FIG. 6, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, optical disc players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 622 may comprise a computer-readable medium that may carry and/or make accessible digital content, including code and/or instructions, for example, executable by processor 620 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate digital content, such as, for example, textual content, multimedia content, and/or the like. A computing and/or network device may also include and/or execute a software application to perform a variety of possible tasks, such as browsing, searching, playing various forms of digital content, including locally stored and/or streamed video and/or games, for example. The foregoing is provided merely to illustrate that claimed subject matter is intended to include a wide range of possible features and/or capabilities.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of digital content, such as signal measurements, text, images, data, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. As discussed above, a change in physical state for a memory device may involve transitioning a memory cell, such as a CES device, from one impedance state to another impedance state by way of application of a critical voltage and a critical current, for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:
a processor; and
a memory controller located on a particular integrated circuit die with the processor, wherein the memory controller to include a non-volatile buffer comprising one or more correlated electron switch devices, wherein the memory controller to interface with a separate non-volatile memory device, wherein the memory controller to store in the non-volatile buffer of the memory controller one or more signals and/or states associated with a persistent memory operation to be directed to the separate non-volatile memory device, the signals and/or states associated with the persistent memory operation to be received from the processor,
wherein to store the one or more signals and/or states to comprise the signals and/or states associated with the persistent memory operation, a circuit to apply a particular current signal to at least one of the one or more correlated electron switch devices during an operation to place the at least one of the one or more correlated electron switch devices in a first impedance state and to establish a reset condition current density requirement for a subsequent operation to place the at least one of the one or more correlated electron switch devices in a second impedance state, the memory controller further to signal to the processor completion of the persistent memory operation responsive to storage of the signals and/or states associated with the persistent memory operation in the non-volatile buffer.

2. The apparatus of claim 1, wherein the non-volatile buffer to maintain the signals and/or states associated with the persistent memory operation subsequent to a removal of power from the non-volatile buffer, and wherein the signals and/or states associated with the persistent memory operation to be communicated between the memory controller and the separate non-volatile memory device subsequent to a restoration of power.

3. The apparatus of claim 2, wherein, to signal to the processor the completion of the persistent memory operation responsive to the storage of the signals and/or states associated with the persistent memory operation in the non-volatile buffer, the memory controller to signal to the processor the completion of the persistent memory operation prior to communication of signals and/or states associated with the persistent memory operation between the memory controller and the separate non-volatile memory device.

4. The apparatus of claim 3, wherein, to signal to the processor the completion of the persistent memory operation, the memory controller to write a reply message into a response queue without waiting for the signals and/or states associated with the persistent memory operation to be communicated between the memory controller and the separate non-volatile memory device.

5. The apparatus of claim 1, wherein the first and second impedance states respectively to include particular approximate resistance and capacitance characteristics.

6. The apparatus of claim 5, wherein the capacitance of the second impedance state to exceed the capacitance of the first impedance state.

7. The apparatus of claim 1, wherein the non-volatile buffer to represent a point of persistency adjacent to the processor.

8. A method, comprising:
storing, in non-volatile buffer of a memory controller, one or more signals and/or states associated with a persistent memory operation communicated between a processor and the memory controller, wherein the processor and the memory controller are located on a particular integrated circuit die, wherein the signals and/or states associated with the persistent memory operation are directed to a separate non-volatile memory device, wherein the non-volatile buffer comprises one or more correlated electron switch devices, and wherein the storing the one or more signals and/or states associated with the persistent memory operation in the non-volatile buffer includes applying a particular current signal to at least one of the one or more correlated electron switch devices during an operation to place the at least one of the one or more correlated electron switch devices in a first impedance state and to establish a reset condition current density requirement for a subsequent operation to place the at least one of the one or more correlated electron switch devices in a second impedance state; and
communicating between the memory controller and the processor a message indicating completion of the persistent memory operation responsive to the storing the one or more signals and/or states associated with the persistent memory operation in the non-volatile buffer.

9. The method of claim 8, further comprising:
maintaining the signals and/or states associated with the persistent memory operation in the non-volatile buffer subsequent to a removal of power from the non-volatile buffer; and
communicating the signals and/or states associated with the persistent memory operation between the non-volatile buffer and the separate non-volatile memory device subsequent to a restoration of power; and
communicating the one or more signals and/or states associated with the persistent memory operation between the non-volatile buffer and the separate non-volatile memory device at a point in time after the communicating the message indicating completion of the persistent memory operation.

10. The method of claim 9, wherein the communicating the message indicating the completion of the persistent memory operation further comprises writing the message indicating the completion of the persistent memory operation to a reply queue of the memory controller without waiting for the signals and/or states associated with the persistent memory operation to be communicated between the non-volatile buffer and the separate non-volatile memory device.

11. The method of claim 9, wherein the first and second impedance states respectively to include particular approximate resistance and capacitance characteristics.

12. The method of claim 11, wherein a resistance of the second impedance state to exceed a resistance of the first impedance state and wherein a capacitance of the second impedance state to exceed a capacitance of the first impedance state.

13. The method of claim 12, wherein the first impedance state to represent a binary value of "0" and second impedance state represents a binary value of "1".

14. The method of claim 8, wherein the persistent memory operation to comprise a persistent write operation, and wherein the non-volatile buffer to represent a point of persistency adjacent to the processor.

15. A system, comprising:
a non-volatile memory device;
a processor and a memory controller located on a particular integrated circuit die, wherein the processor to execute a persistent memory operation directed to a memory location in the non-volatile memory device; and
wherein the memory controller to receive one or more signals and/or states associated with the persistent memory operation from the processor, wherein the memory controller to store in one or more correlated electron switch devices of a non-volatile buffer of the memory controller the signals and/or states associated with the persistent memory operation, wherein to store the one or more signals and/or states associated with the persistent memory operation, a circuit to apply a particular current signal to at least one of the one or more correlated electron switch devices during an operation to place the at least one of the one or more correlated electron switch devices in a first impedance state and to establish a reset condition current density requirement for a subsequent operation to place the at least one of the one or more correlated electron switch devices in a second impedance state, the memory controller further to signal to the processor completion of the persistent memory operation responsive to storage of the signals and/or states associated with the persistent memory operation in the non-volatile buffer.

16. The system of claim 15, wherein the non-volatile buffer to represent a point of persistency adjacent to the processor.

17. The system of claim 16, wherein the wherein the non-volatile buffer to maintain the signals and/or states associated with the persistent memory operation subsequent to a removal of power from the non-volatile buffer, and wherein the signals and/or states associated with the persistent memory operation to be communicated between the memory controller and the separate non-volatile memory device upon a restoration of power.

18. The system of claim 17, wherein the memory controller to signal to the processor completion of the persistent memory operation prior to the signals and/or states associated with the persistent memory operation to be communicated between the memory controller and the non-volatile memory device.

19. The system of claim 18, wherein, to signal to the processor the completion of the persistent memory operation, the memory controller to write a reply message into a response queue without waiting for the signals and/or states associated with the persistent memory operation to be communicated between the memory controller and the non-volatile memory device.

* * * * *